June 29, 1926.

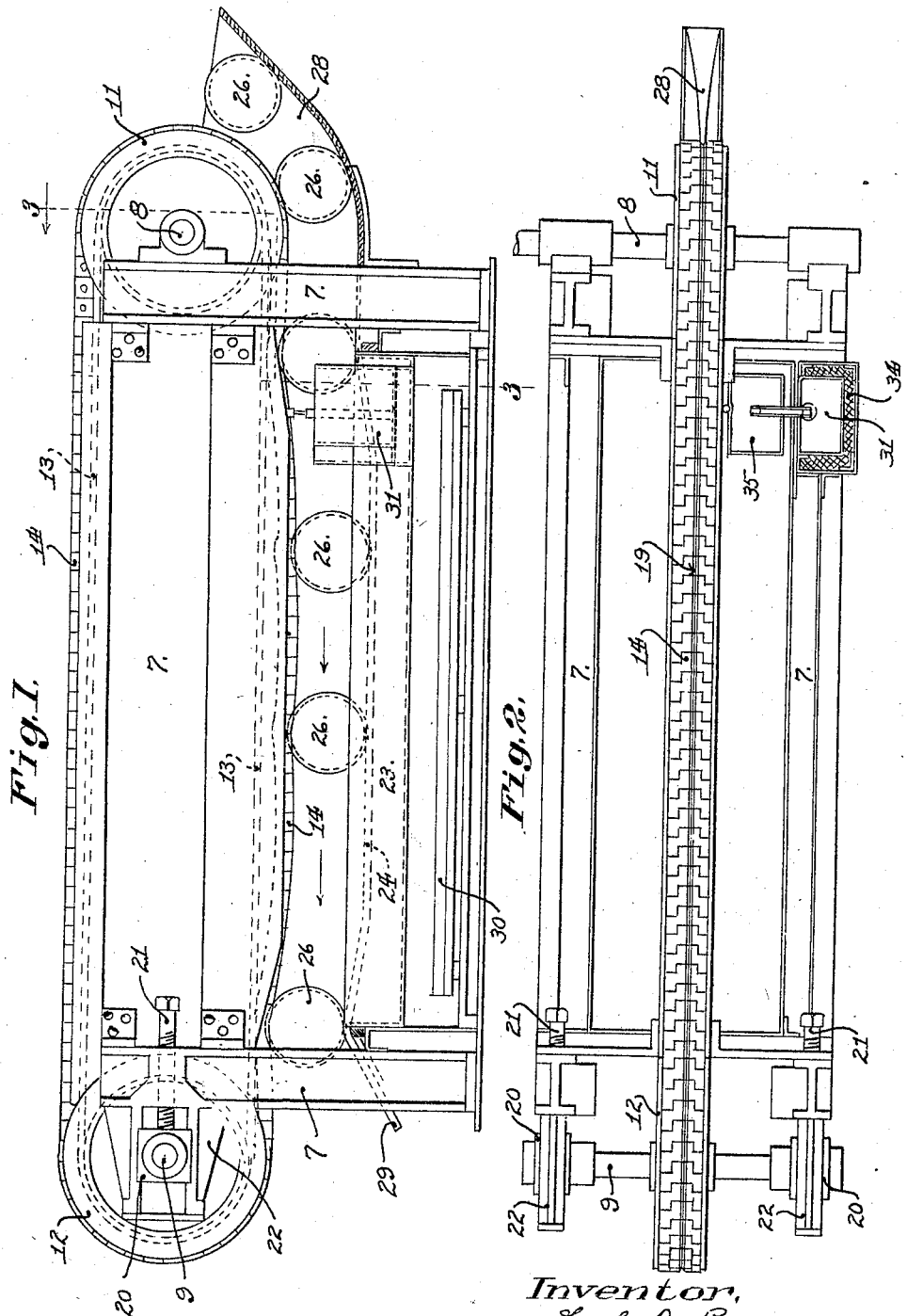

L. D. ROE 1,590,646

APPARATUS FOR APPLYING SOLDER TO CAN CAPS

Filed Oct. 12, 1925   2 Sheets-Sheet 2

Inventor,
Loyal D. R.
By Booth & Booth,
Attorneys.

Patented June 29, 1926.

1,590,646

UNITED STATES PATENT OFFICE.

LOYAL D. ROE, OF ASSOCIATED, CALIFORNIA, ASSIGNOR OF ONE-HALF TO SUMNER E. CAMPBELL, OF ASSOCIATED, CALIFORNIA.

APPARATUS FOR APPLYING SOLDER TO CAN CAPS.

Application filed October 12, 1925. Serial No. 61,912.

My invention relates to a machine for applying a film or coating of solder to the edge portions of can caps or other circular objects.

It is customary in the art to close or seal certain types of product containing cans by means of circular caps which may be either substantially flat disk like bodies or provided with the well known screw top or spout features; and the most usual way of applying such caps is by hand, the operator placing the cap in position over the aperture in the can; then applying flux around the edge of the cap and finally soldering it by means of a heated copper in the usual well known manner.

I have found that a great saving can be accomplished by initially applying a film of solder to the edge portion of the cap and subsequently sweating the prepared cap upon the can.

In actual practice I have demonstrated that, whereas under the hand method of soldering approximately seventeen pounds of solder were required per thousand caps of a given size, it is possible to solder the same number of caps by means of the sweating process with only three pounds of solder. The sweating process is also much more rapid and does not require a skilled solder man. It also makes a stronger joint between the cap and the can and results in a saving of about 75% of the flux used under the hand method.

Moreover it is possible in the sweating process to employ a cylindrical iron or tool made of steel and therefore vastly more durable than the ordinary soldering copper. Such cylindrical tools are known in the art.

The object of the present invention is to provide a simple automatic machine for applying a film of solder to the edge portions of can caps to prepare them for the sweating process above outlined.

In the use of my machine, I employ a suitable flux mixed with the solder which is applied to the cap in a molten state.

Although I shall hereinafter describe my machine as adapted for applying solder to can caps, it will be apparent that it may be used without change of principle for applying any liquefied or adhesive coating to the edge portions of circular disk like bodies. It is also to be understood that the form, proportion and construction of the various parts of the machine may be varied within the scope of the claims hereto appended without departing from the spirit of the invention as expressed in said claims.

For a complete understanding of the invention, reference should be had to the accompanying drawings, wherein—

Fig. 1 is a side elevation of a machine embodying the principles of my invention.

Fig. 2 is a plan view thereof.

Figure 3:
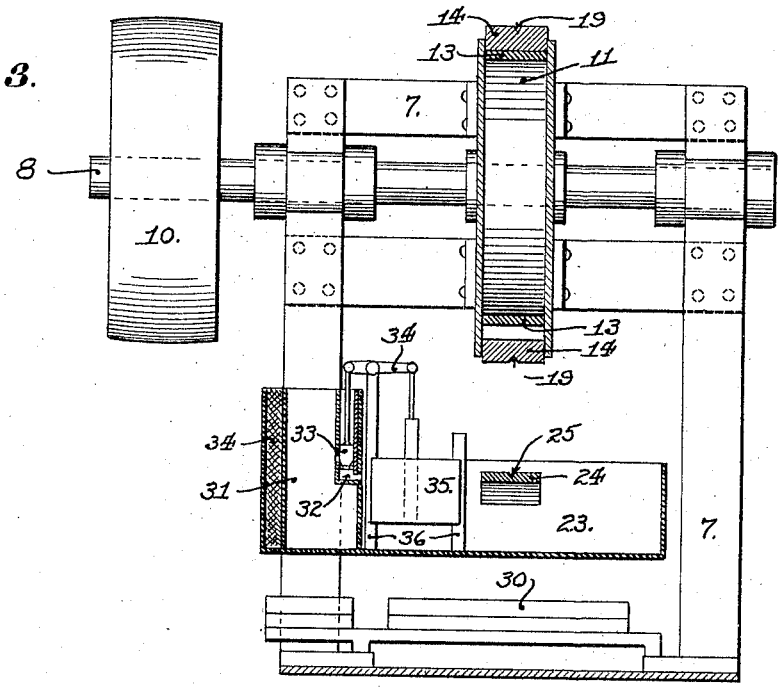
Fig. 3 is a vertical transverse section taken in the direction of the arrow on the line 3—3 of Fig. 1.

In the drawings, the reference numeral 7 designates a frame at the opposite ends of which are mounted two horizontal rotatable shafts 8 and 9 respectively. The shaft 8 is provided with a pulley 10, Fig. 3, by which it may be driven.

Figure 5:
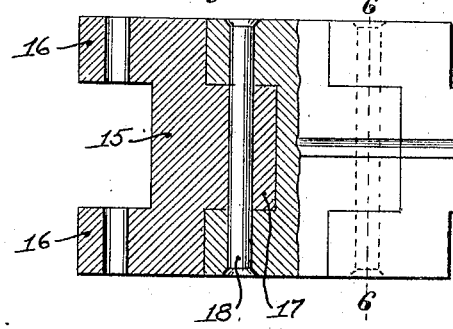
Fig. 5 is a part sectional detail enlarged of the conveyor chain shown in Figs. 1, 2 and 3.
Figure 6:
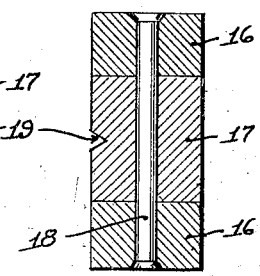
Fig. 6 is a section taken on the line 6—6 of Fig. 5.

Flanged pulleys 11 and 12 are respectively secured upon the shafts 8 and 9, and a belt 13 travels over said pulleys. Surrounding said belt is an endless chain 14 which may be conveniently constructed, as shown in Figs. 5 and 6, of a plurality of similar links 15, each formed with spaced lugs 16, at one side, and a central tongue 17 at the other side adapted to lie between the lugs 16 of the adjacent link. A pin 18 passes through the lugs 16 and tongue 17 of each two adjacent links to pivotally connect the same.

The outer surface of the chain is smooth and flat, as shown, and is provided with a longitudinal groove 19. The inner surface of the chain rests upon and is frictionally engaged by the belt 13. The object of the belt 13 is merely to provide a convenient drive for the chain and to obviate the necessity for employing sprockets instead of the pulleys 11 and 12.

The belt 13 preferably runs tight upon its pulleys, and for this purpose the shaft 9 is mounted in trunnions 20, Fig. 1, adjustable by means of screws 21 in guide brackets 22 to enable the proper tension to be kept on the belt. The chain 14 is preferably a little longer than the belt to enable its lower run to sag slightly.

Below the lower run of the chain 14 is a tank 23, Figs. 1, 2 and 3, adapted to contain molten solder. A fixed longitudinally disposed track 24, Figs. 1 and 3, extends through the tank 23 and is provided with a groove 25, Fig. 3, in its upper surface. The track 24, as shown in Fig. 1, passes over the right hand end wall of the tank 23, then inclines downwardly to carry it below the level of the solder in said tank, and at the left hand end thereof rises again and passes over the left hand wall. The vertical distance between the track 24 and the lower run of the chain 14 is approximately equal to the diameter of the can caps 26 to be treated, and the groove 25 of said track is in vertical alignment with the groove 19 of said chain, so that the caps 26 are rolled along said track by the movement of said chain and are held in a straight path by the resting of their edges within the grooves 25 and 19.

Figure 4:
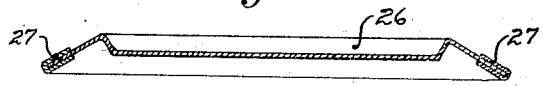
Fig. 4 is a central section of a common form of can cap showing the film of solder applied to the edge portion thereof.

The central portion of the track 24 lying below the level of the molten solder within the tank 23, the edges of the caps 26 as the latter are rolled along said track will become coated with a film of solder, as shown in Fig. 4.

The width of the solder coating 27 depends upon the level of the molten solder in the tank 23 and its thickness depends upon the temperature of said solder.

The caps are introduced into the machine at the right hand end, as shown in Figs. 1 and 2, through a chute 28 which leads them directly to the track 24 and the chain groove 19 and into which they may be dropped successively by hand or by any suitable means, not shown. At the left hand end of the machine the caps 26 are discharged from an extension 29 of the track 24 to any suitable place of deposit, not shown.

In order to maintain the molten solder within the tank 23 at the proper temperature, I employ a suitable heating element indicated at 30 in Figs. 1 and 3, and in order to maintain the level of the molten solder at the proper height above the track 24 I provide a float controlled valve device, which will now be described.

The solder is preferably melted in a small tank 31, Figs. 2 and 3, located adjacent to the main tank 23 and connected therewith by a passage 32 controlled by a valve 33.

A suitable heating element, indicated at 34, may be provided for melting the solder within the tank 31. The valve 33 is controlled through a lever and link mechanism illustrated in Fig. 3, at 34, by a float 35 operating between guides 36 in the main tank 23.

The operation of the machine will be apparent from the foregoing description.

The can caps 26 are successively dropped into the chute 28 and are engaged between the grooves 19 and 25 of the chain 14 and the track 24 respectively, and are rolled along said track by said chain, the sag of the lower run of said chain holding the caps in position. In their travel through the tank 23 the caps 26 receive a coating of solder around their edges, such coating being applied both to the inside and the outside surfaces.

The caps are therefore discharged from the machine in condition to be sweated upon the apertures of the cans for which they are intended. The coating of solder upon the top or outside surface of the caps is of advantage in enabling a cylindrical soldering or sweating tool of well known form to be applied with a rotary motion, thereby producing a perfect joint.

I claim:—

1. An apparatus for coating the edge portions of circular objects comprising a tank adapted to contain a coating medium, a fixed track positioned within said tank below the surface of the medium therewithin, and a movable member positioned above said track and adapted for rolling contact with the objects along it 2. An apparatus for coating the edge portions of circular disks, comprising a tank adapted to contain a coating medium, a longitudinally grooved track positioned within said tank below the surface of the medium therewithin, and means for rolling the disks along the groove of said track by rolling engagement with their upper edges.

3. An apparatus for coating the edge portions of circular disks, comprising a tank adapted to contain a coating medium, a track positioned within said tank below the surface of the medium therewithin, and a flexible travelling member spaced above said track, said member having a longitudinal groove adapted to engage the disks to cause them to roll along said track.

4. An apparatus for coating the edge portions of circular disks, comprising a tank adapted to contain a coating medium, a pair of aligned spaced relatively movably members having longitudinal grooves adapted to engage the disks from opposite sides and to roll them in a substantially horizontal path, one of said members lying below the surface of the medium within said tank.

5. An apparatus for coating the edge portions of circular objects, comprising a tank adapted to contain a coating medium, a fixed track extending through said tank and having the central portion of its length positioned below the surface of the medium within said tank and its end portions inclined to carry them over the end walls thereof, and means for rolling the objects along said track and through said tank.

6. An apparatus for coating the edge portions of circular disks, comprising a tank adapted to contain a coating medium, a longitudinally grooved track positioned within said tank below the surface of the medium therewithin, and a longitudinally grooved travelling member spaced above said track, the grooves of said member and said track being adapted by rolling contact with the opposite edges of the disks to advance them through said tank.

7. An apparatus for coating the edge portions of circular objects, comprising a tank adapted to contain a liquefied coating medium, a track extending through said tank, means for rolling the objects along said track, a receptacle communicating with said tank, means for melting the coating medium in said receptacle, and means for controlling the transfer of the molten medium from said receptacle to said tank.

8. In an apparatus for coating the edge portions of circular objects, comprising a tank adapted to contain a coating medium, a track extending through said tank and positioned below the surface of the medium therewithin, means for rolling the objects along said track, and means for maintaining the medium within said tank at a constant level.

9. An apparatus for coating the edge portions of circular objects comprising a tank adapted to contain a coating medium, a track extending through said tank, an endless travelling belt positioned above said tank and having its lower run spaced above said track, and an endless chain encircling said belt and carried thereby, said chain being adapted to engage the objects to roll them along said track.

10. An apparatus for coating the edge portions of circular objects comprising a tank adapted to contain a coating medium, a track extending through said tank, an endless travelling belt positioned above said tank and having its lower run spaced above said track, and an endless chain encircling said belt and carried thereby, the length of said chain being greater than the length of said belt to permit the lower run of said chain to sag away from the lower run of said belt, to engage the upper edges of the objects to roll them along said track.

In testimony whereof I have signed my name to this specification.

LOYAL D. ROE.